United States Patent [19]

Ljungqvist et al.

[11] Patent Number: 4,563,732
[45] Date of Patent: Jan. 7, 1986

[54] STATIC CONVERTER FOR HVDC POWER TRANSMISSION

[75] Inventors: Rolf Ljungqvist; Sven B. Lübeck, both of Ludvika, Sweden

[73] Assignee: ASEA Aktiebolag, Västerås, Sweden

[21] Appl. No.: 658,837

[22] Filed: Oct. 9, 1984

[30] Foreign Application Priority Data

Aug. 24, 1984 [SE] Sweden .................................. 8404218

[51] Int. Cl.⁴ .............................................. H02J 3/36
[52] U.S. Cl. ........................................ 363/35; 363/51
[58] Field of Search ................... 363/35, 51, 96, 127, 363/128, 131, 135

[56] References Cited

FOREIGN PATENT DOCUMENTS 1300226 12/1972 United Kingdom .

OTHER PUBLICATIONS

Erich Uhlmann, *Power Transmission by Direct Current*, 1975, pp. 132–133.

*Primary Examiner*—Peter S. Wong
*Assistant Examiner*—Anita M. Ault
*Attorney, Agent, or Firm*—Pollock, Vande Sande & Priddy

[57] ABSTRACT

A static convertor for power transmission by means of high-voltage direct current has a current regulator which influences the control angle of the convertor in dependence on the deviation between a current order supplied to the convertor and the present direct current of the convertor. The current regulator has a proportional part and an integrating part. The output signal of the integrating part is limited in the upward direction to a value corresponding to a maximum value of the control angle of the convertor. The output signals from the integrating and proportional parts are added to form the output signal of the current regulator. The limiting value of the integrating part is calculated by a calculating circuit as a function of the current order and the ideal direct voltage of the convertor. The calculation is made by determining the control angle at which, at a load current equal to the current order, the extinction angle becomes equal to the smallest permissible turn-off angle. From this angle there is then subtracted the output of the proportional unit at a current equal to the current order, and the result constitutes the limiting value of the integrating part.

9 Claims, 4 Drawing Figures

STATIC CONVERTER FOR HVDC POWER TRANSMISSION

BACKGROUND OF THE INVENTION

1. Field of the Invention

The present invention relates to a method for controlling a static convertor for power transmission by means of high-voltage direct current (HVDC), in which the direct current of the convertor is measured and compared with a current order. The convertor is controlled with a control angle which is dependent, on the one hand, on a component proportional to any deviation arising between the direct current and the current order and, on the other hand, on a component corresponding to the time integral of any such deviation. In inverter operation and at a direct current which is smaller than the current order, the convertor is controlled so that its current-voltage characteristic has a positive gradient.

The invention also relates to a convertor provided with a control means for carrying out this method.

2. Description of the Prior Art

Convertors of the above-mentioned kind are previously known from the Specification of British Pat. No. 1,300,226. This specification describes an HVDC transmission system in which the characteristic of the inverter is modified within the region of the current margin by making the extinction angle ($\gamma$) current-dependent and increasing it beyond its minimum value ($\gamma_O$). The characteristic within the current margin region is given a positive gradient and in this way static stability for certain operating cases is achieved. It has been shown, however, that this solution can give rise to instabilities in the operation of the convertor and this is particularly true when the convertor is connected to a weak alternating-voltage network. Despite the static stability provided, natural oscillations may occur in the control system, which result in a relatively large AC component being superimposed on the direct current of the plant. In certain cases it has been possible to remedy these phenomena by making the alternating-voltage networks stiffer with the aid of synchronous condensers or static equipment for reactive power compensation, but such solutions are very expensive.

Another convertor of the initially described kind is previously known from Erich Uhlmann: *Power Transmission by Direct Current* (Springer-Verlag, 1975), pages 132-133, FIG. 9.6. In this document a method of increasing the stability is proposed which involves making the inverter, within the current margin region, operate with a constant control angle ($\gamma$), which gives the characteristic a slightly positive gradient within the current margin region. The attenuation of any oscillations which may arise is, however, weak were the Uhlmann method to be employed.

OBJECT OF THE INVENTION

One object of the invention is to provide a control method and a convertor of the initially stated kind, which in a simple manner and at a negligibly low cost provide a stable inverter operation even in the case of connection to a weak alternating-voltage network.

SUMMARY OF THE INVENTION

In its method aspect, the invention comprises controlling an HVDC convertor by measuring the direct current of the convertor and comparing it with a current order. The convertor is controlled with a control angle which is dependent, on the one hand, on a component proportional to the deviation between the direct current and the current order and, on the other hand, on a component corresponding to the time integral of the deviation. In inverter operation and at a direct current lower than the current order, the convertor is controlled so that its current-voltage characteristic has a positive gradient.

BRIEF DESCRIPTION OF THE DRAWINGS

The invention will now be further described, in greater detail, by way of example, with reference to the accompanying drawings, wherein.

DESCRIPTION OF THE PREFERRED EMBODIMENT

Figure 1:
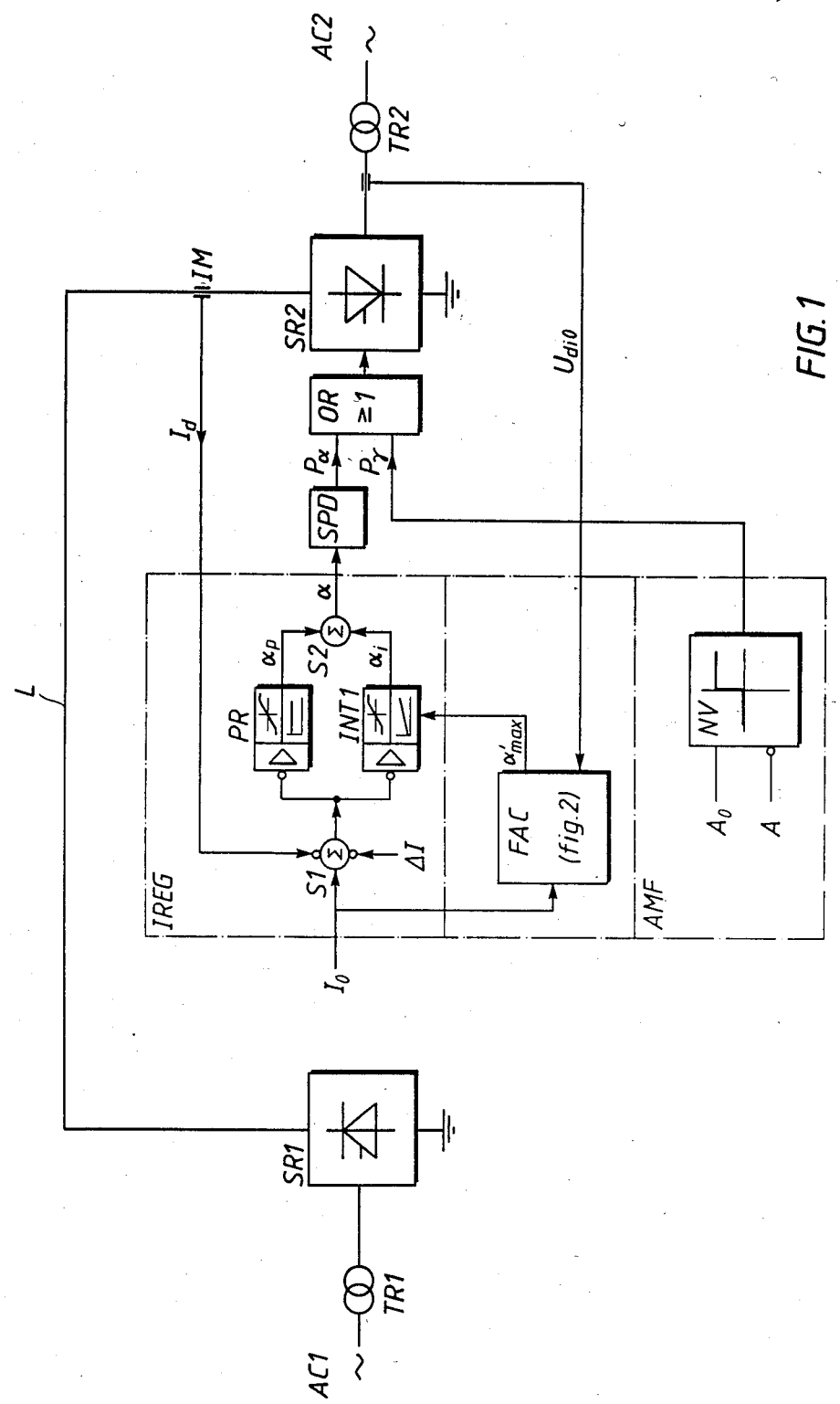
FIG. 1 shows a convertor according to the invention.

FIG. 1 shows equipment for HVDC power transmission. The equipment comprises two convertors, SR1 and SR2, which preferably are convertors of line commutated 12-pulse type. The convertors are connected to respective alternating-voltage networks AC1 and AC2 via convertor transformers TR1 and TR2, respectively. The convertors SR1 and SR2 are interconnected by means of a DC transmission line L.

The two convertors are identical and are provided, in a known manner, with identical control systems. The construction of the convertors, as well as the construction of their control system, are in accordance with conventional and well-known principles, for example such as those stated in the above-mentioned book by Uhlmann and further description is not deemed to be necessary here.

The current regulators of the convertors are however of novel design and the control system of one of the convertors, SR2, will now be further described.

Every convertor must be able to operate as a rectifier or as an inverter to enable the power direction through the transmission line to be reversed. In the following description, the convertor SR1 will be assumed to be operating as a rectifier and the convertor SR2 operating as an inverter.

The convertor SR2 has a current regulator IREG, which is supplied with a current order signal $I_O$. This current order is common to both convertors of the plant and is suitably obtained from a superordinate control system, for example for power or frequency control. The superordinate control system may be located in either of the two convertor stations, and the current order $I_O$ is transmitted to the other station by means of, for example, a telecommunications channel.

A signal $\Delta I$, the so-called current margin, is subtracted from the current order $I_O$ in a summator S1. From a DC measurement device IM on the line L a signal $I_d$ is obtained which corresponds to the direct current flowing in the line. This signal $I_d$ is also subtracted from $I_O$ in the summator S1. If the direct current $I_d$ of the convertor deviates from the value obtained by the subtraction of the current margin $\Delta I$ from the current order $I_O$, an output signal from the summator S1 appears and is supplied to the two parts of the current regulator now to be described. All the while $I_O - I_d - \Delta I$ equals zero there is no output from the summator S1.

In prior art plants, the current regulator normally consists of a single regulator with a proportional-integrating characteristic (PI-characteristic). According to the invention, the regulator is now divided into two parts, these being a separate proportional regulator part PR and a separate integrating part INT1. Both these parts are supplied with the output signal from the summator S1. The proportional regulator part PR has an amplification factor k and supplies an output signal $\alpha_p$ to a summator S2. The integrating part INT1 has a purely integrating characteristic and supplies an output signal $\alpha_i$. According to the invention, the integrating part INT1 is provided with a limiting input, which is supplied with a signal $\alpha'_{max}$ obtained from a calculating circuit FAC. Therefore, the output signal of the integrating part INT1 can never exceed the value $\alpha'_{max}$ supplied to the limiting input. The output signal $\alpha_i$ from from the integrating part is supplied to the summator S2, which forms a resulting output signal $\alpha = \alpha_p + \alpha_i$. The signal $\alpha$ constitutes the control angle order which is supplied, by the control system, to a control pulse device SPD of the convertor. This device supplies, in a manner known per se, control or ignition pulses $P\alpha$ with a control angle of the ordered value $\alpha$. These pulses are supplied to an Or-gate OR. A second input of the Or-gate OR is supplied with pulses $P\gamma$ from an extinction angle control circuit AMF.

The circuit AMF may be constructed, for example in the manner described in an article by Forsell entitled "The Gotland DC Link: The Grid Control and Regulation Equipment" and published in Direct Current, Vol. 2, No. 5, June 1955; in Direct Current, Vol. 2, No. 7, Dec. 1955; in British Pat. No. 985,674; and in IEEE Transactions on Power Apparatus and Systems, Vol. PAS-87, No. 3, March 1968, pp. 859-865.

In the manner described in the above-mentioned publications, the voltage time integral A, which remains up to the zero passage of the commutating voltage and which is available for commutation, is continuously calculated. Further, a reference value $A_O$ is calculated which corresponds to the voltage time integral required for the commutation at the direct current in question to be completed at a certain angle $\gamma_O$ before the zero passage of the commutating voltage. The angle $\gamma_O$ is the so-called extinction angle and has suitably a constant value in the range 15°-20°. During each period, the quantities $A_O$ and A are continuously compared in a level flip-flop NV. The quantity A decreases continuously with time and when it is equal to the reference quantity $A_O$, the level flip-flop NV delivers an output signal $P\gamma$.

The pulses $P\alpha$ and $P\gamma$ are thus both supplied to the Or-gate OR, which means that whichever of the two pulses arrives first at the Or-gate is supplied to the convertor valve in question (SR2) and makes it conducting.

Figure 2:
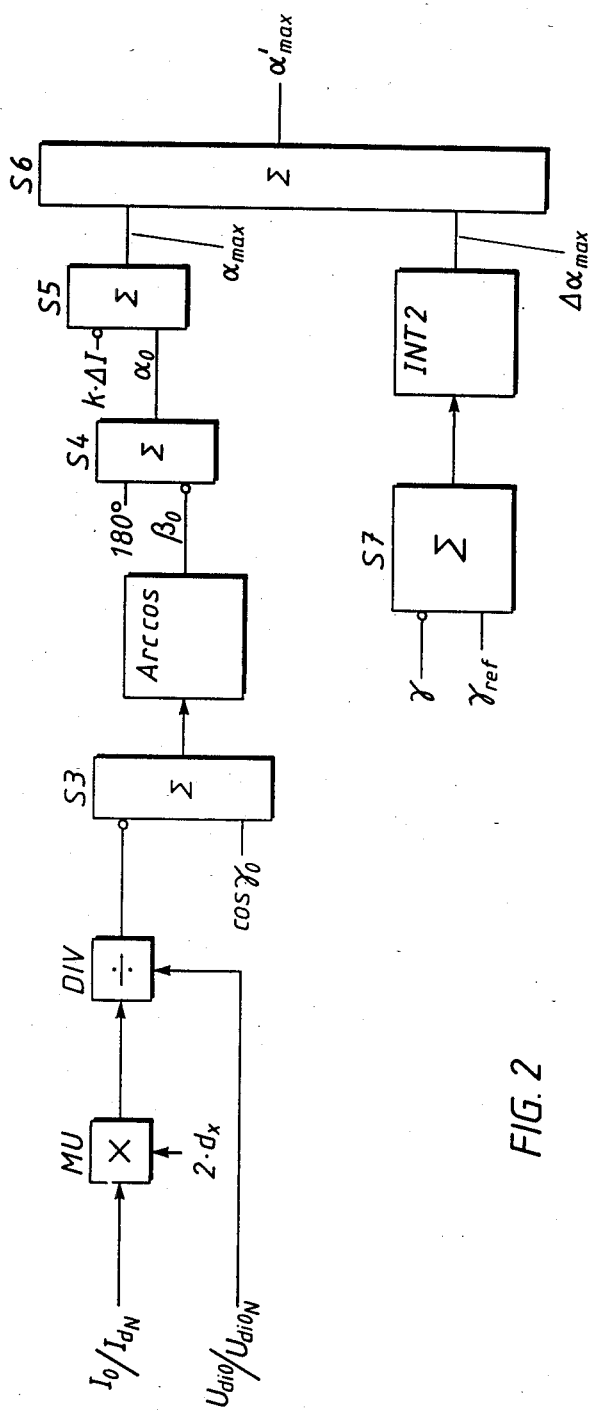
FIG. 2 shows schematically a device for calculating the limiting value $\alpha_{max}$.

FIG. 2 shows, in greater detail, one arrangement for the calculating circuit FAC in FIG. 1 used to calculate the upper limit value $\alpha_{max}$ to be fed to the integrating part INT1. First the control angle $\alpha_O$ is calculated which, at a direct current equal to the ordered current $I_O$, gives a turn-off angle $\gamma = \gamma_O$. In accordance with known relationships, this control angle is obtained from the equations $$\cos \beta_O = \cos \gamma_O - 2 \cdot d_x \cdot \frac{I_O}{I_{dN}} \cdot \frac{U_{diON}}{U_{diO}}$$

$$\alpha_O = 180° - \gamma_O$$

In these relationships
$d_x$ = the impedance of the alternating voltage network
$I_{dN}$ = the nominal current of the convertor
$U_{diO}$ = the ideal direct voltage of the convertor (open circuit voltage at $\alpha = 0$).
$U_{diON}$ = the ideal direct voltage of the convertor at nominal mains voltage.

The current order $I_O$, multiplied by a suitable scaling factor, is supplied in the form of the quantity $$\frac{I_O}{I_{dN}}$$

to a multiplier MU, to the second input of which there is supplied a quantity $2 \cdot d_x$. The output signal of the multiplier MU is supplied to one input of a dividing circuit DIV. To the second input of the dividing circuit there is supplied a quantity $$\frac{U_{diO}}{U_{diON}}$$

which is obtained by measuring the amplitude of the voltage in the alternating voltage network connected to the convertor and multiplying that amplitude by a suitable scaling factor. In a summator S3, the output signal of the dividing circuit is subtracted from a constant value, corresponding to $\cos \gamma_O$. The output signal of the summator S3 is supplied to a calculating circuit Arccos with arccosine function and the output signal of which constitutes the angle $\beta_O$. In a summator S4, the angle $\gamma_O$ is subtracted from the constant value 180°, to give the angle $\alpha_O$. In a summator S5, an amount $k \cdot \Delta I$ is subtracted from the angle $\alpha_o$, where k is the amplification factor of the proportional regulator part PR in FIG. 1 and $\Delta I$ is the current margin. Thus, the amount $k \cdot \Delta I$ corresponds to the output from the proportional regulator part PR in the case where the input signal to the PR is equal to the current margin. The output signal $\alpha_{max}$ from the summator S5 constitutes the limiting value for the output signal $\alpha_i$ of the integrating part INT1 (it is presumed that the correction $\Delta\alpha$ is zero, and therefore $\alpha'_{max} = \alpha_{max}$).

Figure 3:
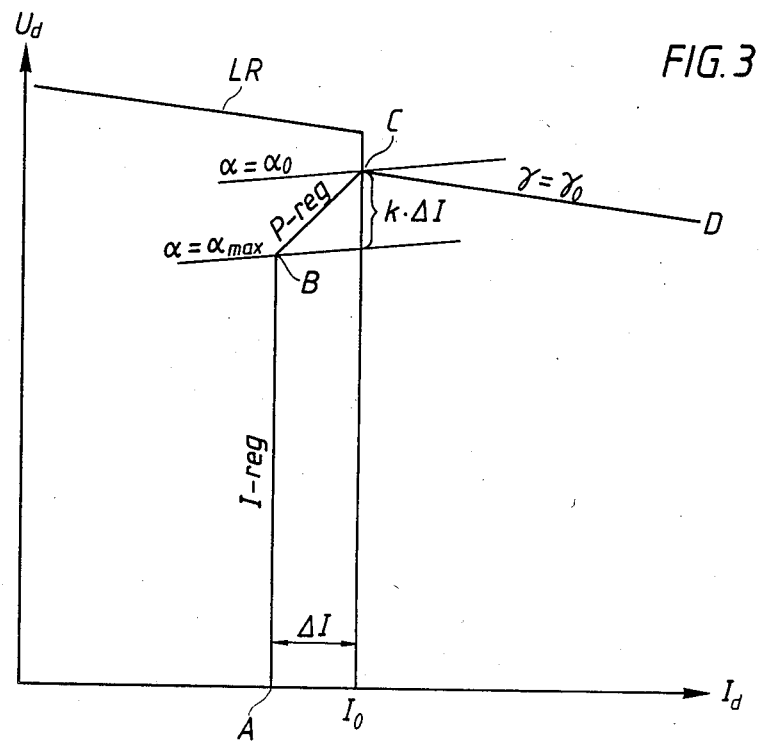
FIG. 3 shows the current-voltage characteristic of one convertor according to the invention.

The current-voltage characteristic obtained from a static convertor according to the invention is shown in FIG. 3 (curve A-B-C-D). The vertical curve portion A-B constitutes the conventional current control of the convertor SR2 operating as an inverter. The two curves designated $\alpha = \alpha_O$ and $\alpha = \alpha_{max}$ constitute the direct voltage of the convertor as a function of the current during operation with a constant control angle having, respectively, the values $\alpha_O$ and $\alpha_{max}$. When operating within the curve portion B-C, $\alpha$ is greater than $\alpha_{max}$ and the output signal of the integrating regulator unit is, therefore, constant and equal to $\alpha_{max}$. Under these conditions, control is performed completely by the proportional part PR of the regulator. The greater the inclination of the curve portion B-C, the greater will be the attenuation of any natural oscillations. By a suitable choice of the amplification factor k of the proportional part PR, the inclination of the curve portion B–C can be adjusted so as to obtain a sufficiently good damping and, therefore, stable operation even in the case of weak AC networks.

Therefore, as is clear from FIG. 3, a considerably improved attenuation of the natural oscillations can be obtained, compared with the case of previously proposed convertors operating with a constant control angle within the current margin region ($I_O - \Delta I < I_d < I_O$). The circuit according to the invention only makes use of the constant or substantially constant quantities $I_O$ and $U_{diO}$. Any feedback couplings, for example via the actual value of the current or the voltage, which may give rise to instabilities, do not exist in a circuit according to the invention.

Within the final curve portion C–D, the convertor operates in a conventional manner with the extinction angle $\gamma = \gamma_O$ (the extinction angle control circuit AMF in FIG. 1 then determining the moment of ignition).

Unavoidable calculation and measurement faults will result in the limiting value $\alpha_{max}$ deviating from the ideal value which is determined by the mathematical relationships stated above. If too low a value of $\alpha_{max}$ is obtained, the convertor SR2 will, during normal operation ($i_d = I_O$), operate with an extinction angle which exceeds the value $\gamma_O$. This results in an unnecessarily high consumption of reactive power and, furthermore, unnecessarily high harmonics. On the other hand, if $\alpha_{max}$ is given too high a value, the extinction angle control circuit AMF in FIG. 1 will determine the control angle within a part of the current margin region, which results in a risk of unstable operation. To eliminate the possibility of the above-mentioned faulty $\alpha_{max}$ values arising, a slow feedback can be provided and this is illustrated in FIG. 2.

To a summator S7 there are supplied, on the one hand—with a negative sign—a constant value $\gamma_{ref}$, which, for example, may be equal to $\gamma_O$ and, on the other hand, a signal which corresponds to the value of the extinction angle $\gamma$ in question. The difference between these signals is supplied to an integrator INT2, which has a large time constant, for example of the order of magnitude of one or a few minutes. The output signal $\Delta\alpha_{max}$ of the integrator is supplied, together with the signal $\alpha_{max}$, to a summator S6. In the equilibrium state, the output signal $\Delta\alpha_{max}$ of the integrator will assume such a value that $\gamma = \gamma_{ref}$. Thus, the signal $\alpha_{max}$ will correct any faults in the signal $\alpha_{max}$ obtained from the summator S5, and the output signal $\alpha'_{max}$ from the summator S6, which is supplied to the integrating part INT1 as a limiting signal, will correspond closely to the desired value.

The method described above can be used when operating with an extinction angle which, in normal operation, somewhat exceeds the smallest permissible value $\gamma_O$. If, in normal operation, it is desired to operate with the smallest permissible extinction angle $\gamma_O$, it is possible to use, in place of or in addition to, a method which detects when ignition takes place via the extinction angle control circuit AMF, and which delivers a suitable input signal to the integrator INT2. Via the output signal $\Delta\alpha_{max}$ of the integrator INT2, the limiting value $\alpha_{max}$ will thereby continually be corrected and will be maintained at such a value that, in the equilibrium state, the extinction angle will have its smallest permissible value $\gamma_O$.

Figure 4:
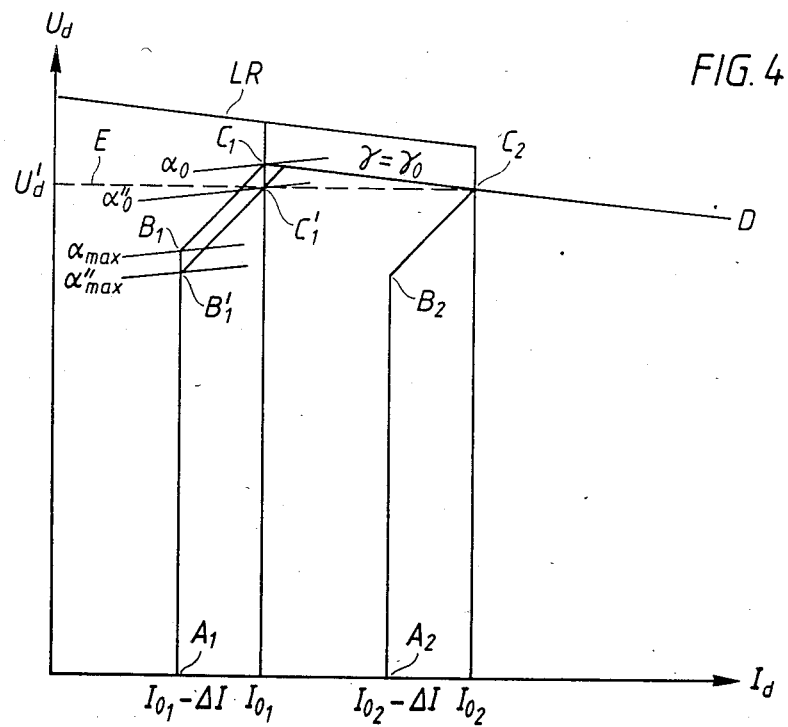
FIG. 4 shows the current-voltage characteristics of two parallel-working inverters according to the invention.

In prior art convertors, obtaining a stable parallel operation of two or more inverters has constituted a major problem. It has been established that a control method and a control equipment according to the invention provide good stability also for this operating case. To obtain the desired current division between the parallel-operating inverters, as shown in FIG. 4, the limiting value $\alpha_{max}$ may be modified for the convertor which has the lowest current order.

Assume the two parallel-operating inverters have the current order values $I_{O1}$ and $I_{O2}$. When controlling the convertors according to the principles described above, the first-mentioned convertor receives the characteristic $A_1$-$B_1$-$C_1$-D and the second convertor receives the characteristic $A_2$-$B_2$-$C_2$-D. The second convertor determines the operating voltage, which implies that the convertor with the lower current order $I_{O1}$ will receive a current lower than the current order and that the convertor with the current order $I_{O2}$ will receive a current which is higher than the current order. To avoid this undesired uneven distribution of the load current, the calculation of the limiting value $\alpha_{max}$ for the integrating part of the current regulator may be modified so that a value $\alpha_O''$ is calculated according to $$-\cos \alpha_O'' = -\cos \alpha_O - \frac{I_{O2} - I_{O1}}{I_{dN}} \cdot \frac{U_{diON}}{U_{diO}} (d_x - d_r)$$

where $d_x$ is the inductive impedance on the alternating voltage side of the convertor and $d_r$ is the resistive impedance on the alternating voltage side of the convertor. Thereafter the modified limiting value $\alpha''_{max}$ is calculated according to $\alpha''_{max} = \alpha_O'' - k \cdot \Delta I$. The thus modified characteristic is represented by the curve $A_1$-$B_1'$-$C_1'$-D. The working voltage $U'_d$ of the two convertors is determined by the convertor with the higher value $I_{O2}$ of the current order and is indicated in FIG. 4 by the dashed horizontal line E. The working points for the two convertors are $C_1'$ and $C_2$, that is, both convertors will operate with currents equal to the ordered current values $I_{O1}$ and $I_{O2}$.

The formula set out above is valid provided that the same ideal direct voltage ($U_{diO}$) prevails in the two parallel-operating inverters, that is, that the inverters are connected to the same alternating voltage network and have synchronized tap changers. If the ideal direct voltages of the inverters differ from one another, the above noted formula will have to be modified so as to make allowance for this fact.

The control equipment for a convertor according to the invention may be constructed, in a conventional manner, completely from analog circuits or completely from digital circuits, or from a combination of these two types of circuits. When using digital circuits, these may either consist of specially built circuits or of appropriately programmed microcomputer circuits or corresponding units. When using programmed digital circuits it may be impossible physically to separate the proportional and integrating parts of the current regulator from one another. It may then be more suitable to designate the current regulator as being provided with a proportional partial function, and an integrating partial function with a limited output signal.

The foregoing has described how the limiting value for the integrating part is determined by subtracting from the calculated value $\alpha_O$ a quantity $k \cdot \Delta I$ which consists of the output of the proportional part for a current deviation equal to the current margin. The output signal $\alpha$ of the current regulator is then obtained by summing the output signals $\alpha_p$ and $\alpha_i$ from the proportional and the integrating parts. According to an alternative embodiment of the invention, which gives exactly the same function and characteristic of the convertor, the current margin can be subtracted only from the input signal to the integral part but not from the input signal of the proportional part. In this way, the output signal of the proportional part becomes zero when $I_d = I_O$, whereby $\alpha_{max} = \alpha_O$. The proportional part will then have a negative sign for $I_d < I_O$.

The embodiments described can be modified in many ways within the scope of the following claims and all such modifications should be understood to be within the spirit and scope of the present invention.

What is claimed is:

1. A method for controlling a convertor in an HVDC power transmission system, said convertor being supplied with a current order for control of the direct current of the convertor, which method involves measuring the direct current of the convertor, determining the difference between on the one hand the measured current and, on the other hand, the current order decreased by a current margin value, controlling the convertor with a control angle which is dependent on the one hand, on a proportional component being a linear function of said difference and, on the other hand, on an integral component corresponding to the time integral of the said difference, characterized in that the integral control angle component is limited to a value corresponding to a first value of the control angle of the convertor in such a way that, when the component thus limited is added to the proportional component, the converter receives a positive current-voltage characteristic at a direct current which is lower than the current order.

2. A method according to claim 1, in which said first value of the control angle is continuously calculated in dependence on the direct current of the convertor.

3. A method according to claim 2, in which said first value of the control angle is calculated in dependence on the current order.

4. A method according to claim 3, in which said first value of the control angle is calculated by calculating the control angle, at which, at a current equal to the current order, the extinction angle of the convertor has a predetermined minimum value, whereafter an amount is subtracted from said control angle corresponding to the magnitude of the proportional component at a current equal to the current order.

5. A method according to claim 1 for a plurality of convertors having different current orders which operate in parallel in inverter operation, characterized in that in each of the convertors which has a lower current order value than the highest of the current order values, the control angle component corresponding to the time integral of the said difference is limited in dependence on the difference between the highest current order value and the current order of the convertor to an amount which corresponds to the control angle which, when the current of the convertor is equal to its current order, gives the convertor a voltage which is equal to the voltage of that convertor which has the highest current order, when the current of the latter convertor is equal to its current order.

6. A convertor in a HVDC power transmission system, said convertor including a current regulator with one proportional part and one integrating part, means to supply a current order signal and a signal corresponding to the measured direct current of the convertor and means to control the control angle of the convertor in dependence on the difference between the current order, decreased by a current margin value, and the measured direct current, means arranged, in inverter operation and at a current lower than the current order, to impart a positive inclination to the current-voltage characteristic of the convertor, characterized in that, limiting members are arranged to limit the output quantity from the integrating part of the current regulator to an amount corresponding to a first value of the control angle of the convertor in such a way that, when the thus limited component is added to the output of the proportional part of the current regulator, the convertor receives a positive current-voltage characteristic at a direct current which is lower than the current order, in that summation members are arranged to sum up the output quantities from the proportional and the integrating parts of the current regulator, and in that the quantity resulting from that summation is supplied to circuit means for control of the convertor with a control angle corresponding to said quantity resulting from that summation.

7. A convertor according to claim 6, in which calculating members are arranged, in dependence on the direct current of the convertor, to calculate continuously a quantity corresponding to said first value of the control angle and to supply said quantity to the said limiting member.

8. A convertor according to claim 7, in which the calculating members are arranged to carry out the calculation in dependence on the current order.

9. A convertor according to claim 8, in which the calculating members are arranged to calculate the quantity corresponding to said first value of the control angle by calculating the control angle at which, at a current equal to the current order, the extinction angle of the convertor has a predetermined minimum value and subtracting from the thus calculated control angle an amount which corresponds to the output quantity of the proportional part of the current regulator at a current equal to the current order.

* * * * *